R. A. BOWER.
FAUCET LEVER FOR ELECTRICAL WATER HEATERS.
APPLICATION FILED FEB. 9, 1914.

1,097,292.  
Patented May 19, 1914.

WITNESSES:  
H. A. Stock  
S. Constine

INVENTOR  
Robert A. Bower  
BY  
Askey, Totten  
ATTORNEYS

UNITED STATES PATENT OFFICE.

ROBERT A. BOWER, OF SAN FRANCISCO, CALIFORNIA.

FAUCET-LEVER FOR ELECTRICAL WATER-HEATERS.

1,097,292.  Specification of Letters Patent.  Patented May 19, 1914.

Application filed February 9, 1914.  Serial No. 817,490.

*To all whom it may concern:*

Be it known that I, ROBERT A. BOWER, a citizen of the United States, residing at the city and county of San Francisco and State of California, have invented certain new and useful Improvements in Faucet-Levers for Electrical Water-Heaters, of which the following is a specification.

This invention relates to an improved faucet lever for electrical water heaters and the means for adjustably attaching the same to the stem of the valve rotatably mounted within the body of the faucet for controlling the flow of water through the water-way thereof; the object of the invention being to securely unite the faucet lever or switch to the stem of the controlling valve in such a manner as to prevent the same working loose during use, the form of connection being such as to permit of the faucet lever being stamped from a single piece and by so doing avoiding the machine work and expense at present necessary for the finishing of the faucet lever.

To comprehend the invention reference should be had to the accompanying sheet of drawings, wherein—

Figure 1:
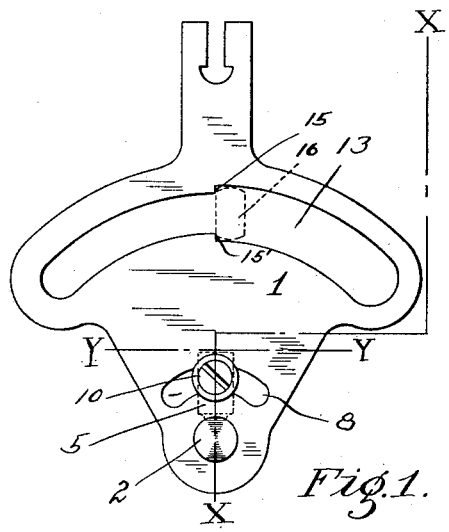
Figure 2:
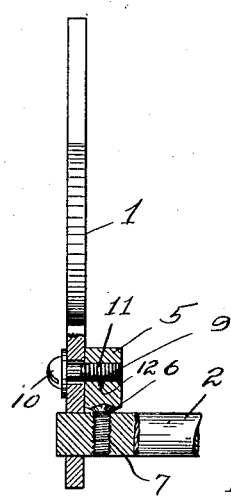
Figure 3:
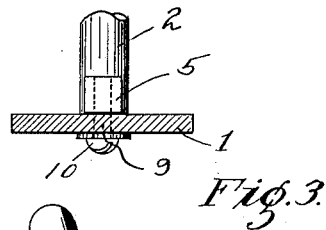
Figure 4:
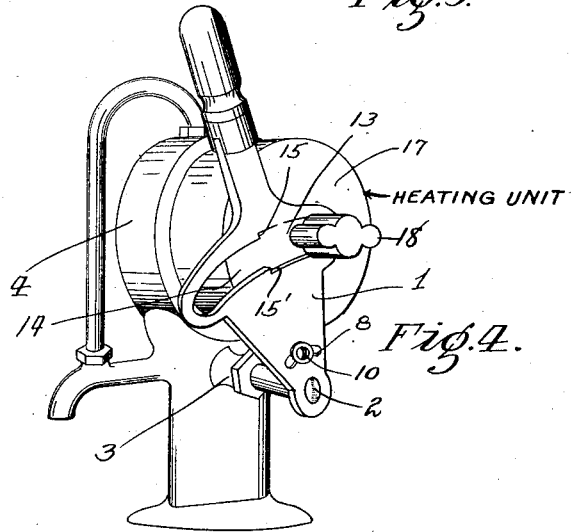

Figure 1 is a front elevation of the faucet lever disclosing the lock screw for uniting the lever to the stem of the faucet valve. Fig. 2 is a vertical sectional view taken on the line $x$—$x$—Fig. 1 of the drawings. Fig. 3 is a cross sectional view taken on line $y$—$y$ of Fig. 1 of the drawings. Fig. 4 is a perspective view illustrating the water faucet, the faucet lever united to the stem of the rotatable controlling valve of the faucet, the electrical heating unit applied to the faucet, and the switch for making and breaking the electrical circuit of the water heating unit.

In the drawings, the numeral 1 is used to designate the faucet lever mounted at its lower end on the stem 2 of the water controlling valve rotatably held within the body of the faucet 3 for controlling the flow of water through the usual water way thereof into the usual heating chamber of the casing 4 of the heating unit.

Inasmuch as the present invention does not relate to the construction of the faucet proper nor to the heating unit and these parts being of usual construction, it is deemed unnecessary to illustrate and describe the construction thereof.

From the stem 2 upwardly extends a stud or post 5, the reduced lower end 6 thereof being threaded and screwing into a threaded socket 7 in the said stem 2, Fig. 2 of the drawings. Within a short segment slot 8 formed in the lower portion of the faucet lever 1 passes an attaching pin 9, the enlarged head 10 of which bears or seats against the outer face of the faucet lever, while the screw threaded section 11 thereof screws into a threaded bore 12 of the stud or post 5 for securely holding or uniting the lever 1 to the said post. The lower end of the lever 1 is loosely mounted on the end of the stem 2, so as to turn thereon on a loosening of the screw or threaded attaching pin 9 in order to allow of the same being properly positioned relative to the stud or post 5 for varying the throw of the stem 2 of the water controlling valve within the faucet when the attaching pin is screwed up to clamp the lever to the said post 5.

Adjacent the upper portion of the lever 1 is formed a segmental slot 13, provided with a narrowed extension 14 to provide shoulders 15 and 15' for engagement with the shoulder portions of a rectangular shaped stem 16 of a switch 18, on the said switch turning to close the usual electrical contacts (not shown) within the casing of the electrical heating unit 17, so as to prevent the faucet lever being thrown to cut off the water supply through the faucet while the electrical circuit is a closed one, the said lever being permitted to swing its full distance to close or cut off the water supply from the faucet into the water chamber of the heating unit 17 only when the switch 18 is turned to open the electrical circuit, at which time the narrow portion of the stem 16 is presented to the segmental slotted portion of the faucet lever, which permits of the shouldered portions 15 and 15' moving freely over the surfaces thereof. Thus, while the faucet lever is free to be thrown its full distance when the electrical circuit is an open one for positioning the faucet valve to open or close the flow of water therethrough, its range of movement is limited to throwing the said valve to open the water passage-way of the faucet when the electrical circuit of the heating unit is closed. By this means the burning out of the electrical connection is insured, inasmuch as the water-way must remain an open one for the free flow of water through the faucet into the water chamber of the casing of the heating unit at all times while the electrical circuit is closed. This is an important feature in connection with devices of the described character, and one which will appeal to users thereof.

Having thus described the invention what is claimed as new and desired to be protected by Letters Patent is:—

1. The combination with a water faucet provided with a controlling valve the stem of which projects beyond the same, of an electrical heating unit connected to said faucet, a faucet lever loosely mounted on the valve stem, an attaching post upwardly projected from said stem, and a securing pin projected through a segmental opening in the lower portion of the lever for adjustably connecting the same to said post.

2. The combination with the stem of a valve controlling the flow of water through a faucet into the water chamber of an electrical heater, of an attaching post adjustably connected thereto, a faucet lever loosely mounted on said stem, and a securing pin passing through a segmental slotted portion of the lever for adjustably uniting the same to said post.

3. The combination with a water faucet provided with a rotatable controlling valve provided with a projecting stem, of an electrical heating unit connected to said faucet, a faucet lever loosely mounted on the valve stem, an attaching post projected from said stem, a securing pin passing through a segmental slot in the lower portion of the faucet lever for adjustably uniting the same to the attaching post, an electrical switch provided with a stem extended through a segmental slot in the faucet lever and passing into the heating unit for controlling the opening and closing of the circuit thereof, and shoulders or obstructions in the said segmental slot of the faucet lever for limiting the movement thereof on the switch being thrown to close the electrical circuit of the heating unit.

In testimony whereof I have signed my name to this specification in the presence of two subscribing witnesses.

ROBERT A. BOWER.

Witnesses:
HARRY A. TOTTEN,
D. B. RICHARDS.

Copies of this patent may be obtained for five cents each, by addressing the "Commissioner of Patents, Washington, D. C."